United States Patent
Murthy

(10) Patent No.: US 7,257,605 B2
(45) Date of Patent: Aug. 14, 2007

(54) SYSTEM FOR HETEROGENEOUS DISTRIBUTED TRANSACTION MANAGEMENT IN DATABASE SYSTEMS

(75) Inventor: Raghupathi Keshava Murthy, Union City, CA (US)

(73) Assignee: International Busniess Machines Corporation, Armonk, NY (US)

( * ) Notice: Subject to any disclaimer, the term of this patent is extended or adjusted under 35 U.S.C. 154(b) by 465 days.

(21) Appl. No.: 10/775,739

(22) Filed: Feb. 9, 2004

(65) Prior Publication Data

US 2005/0182795 A1 Aug. 18, 2005

(51) Int. Cl.
*G06F 17/30* (2006.01)
(52) U.S. Cl. .................................................. 707/200
(58) Field of Classification Search ................ 707/1, 707/2, 200; 709/221
See application file for complete search history.

(56) References Cited

U.S. PATENT DOCUMENTS

| | | | |
|---|---|---|---|
| 5,247,664 A | 9/1993 | Thompson et al. | 395/600 |
| 5,924,095 A | 7/1999 | White | 707/10 |
| 6,016,495 A * | 1/2000 | McKeehan et al. | 707/103 R |
| 6,275,843 B1 * | 8/2001 | Chorn | 718/101 |
| 6,411,956 B1 | 6/2002 | Ng | 707/10 |
| 6,463,456 B1 | 10/2002 | Kan et al. | 709/201 |

OTHER PUBLICATIONS

IBM Corporation and others, CICS Application Programming Guide, 2000, Common Public License v 1.0.*
"Technical Standard, Distributed Transaction Processing: The XA Specification," Dec. 1991, X/Open Company Limited, Apex Plaza Forbury Road, Reading, Berkshire, RG1 1AX, United Kingdom.

* cited by examiner

*Primary Examiner*—Etienne P LeRoux
(74) *Attorney, Agent, or Firm*—Konrad Raynes & Victor LLP; David W. Victor

(57) ABSTRACT

Disclosed is a mechanism that can be implemented in database systems to support distributed transactions in heterogeneous systems. Once the transaction manager of a database system implements this mechanism, application developers and vendors can integrate new datasources into the transaction manager of the database system. This would simplify the application design and ensure the integrity of data and interactions. The interface and interactions between the transaction manager and external datasources (both structured and non-structured) conform to X/Open XA standards. Also disclosed is a technique to design the system catalogs for organizing the datasources and instances of the new datasources.

19 Claims, 2 Drawing Sheets

SYSTEM FOR HETEROGENEOUS DISTRIBUTED TRANSACTION MANAGEMENT IN DATABASE SYSTEMS

BACKGROUND OF THE INVENTION

1. Field of the Invention

This invention relates generally to database systems. More particularly, it relates to a transactional mechanism supporting complete, heterogeneous distributed transactions in database systems.

2. Description of the Related Art

Databases are increasingly becoming the central point of heterogeneous integration. Ideally, an integrated database system would provide database applications a single point of access to the underlying databases, regardless whether the databases are relational, non-relational, structured, or non-structured. In practice, this is difficult to achieve due to the proprietary nature of the system, e.g., programming language, platforms, client-server protocols, transaction protocols, and standards, in which each individual database resides.

Several popular database systems have implemented mechanisms to allow certain degrees of heterogeneous integration. For example, IBM® DB2 Universal Database™, hereinafter referred to as "DB2, " implemented federated databases and wrapper modules such as DB2 Information Integrator and DB2 Data Joiner to integrate external data sources into database transaction. On the other hand, Oracle database applications can communicate with external data sources via a proprietary gateway and tools. Similarly, Sybase® provides a drivers and gateways to access external data. These proprietary gateways and tools are familiar to one skilled in the art and thus are not further described herein.

Unfortunately, these mechanisms are tailored to individual proprietary database systems and currently lack complete, full-fledged support for heterogeneous distributed transactions. These proprietary transactional mechanisms cannot be readily extended to integrate with new systems or datasources.

It has become increasingly desirable for database systems to support heterogeneous distributed transactions accessing structured as well as non-structured external data sources. What is more, there exists a need in the art to extend such a complete distributed transaction support to native database systems in a dynamic, efficient, and economical manner.

SUMMARY OF THE INVENTION

The present invention fulfills the aforementioned desire and need in the art with a new and innovative transactional mechanism supporting heterogeneous distributed transactions accessing external data sources, both structured and non-structured.

This transactional mechanism integrates the handling of distributed transactions, including two-phase commit, into a single transaction management without requiring protocol conversion. By adapting the X/Open XA standard to the database context, this transactional mechanism provides a viable, attractive, and desirable solution for database systems to handle heterogeneous distributed transactions accessing external data sources, regardless of their underlying database structure, or the lack thereof.

With the transactional mechanism disclosed herein, an independent vendor can readily and dynamically extend a native database system to provide complete transactional support in communicating and accessing external data sources, e.g., messaging, web services, which may or may not be structured. The transactional mechanism also enables easy integration with new database or information systems.

This would also reduce the application complexity. By relying on the database system to manage the distributed transaction, the application can eliminate the code to interact with transaction manager to manage a distributed transaction. Using standard SQL, an application would be able to access distributed data and rely on the database engine to manage the distributed transaction. Transaction Managers can be implemented as separate products to manage distributed transactions.

The transactional mechanism is implemented primarily in the transaction manager of a database engine in a database system such as the IBM Informix Dynamic Server (IDS). The IDS currently supports distributed data access via gateways, homogeneous database systems (distributed transaction among multiple instances of the IDS), User Defined Routines (UDR), table functions, VTI/VII (Virtual Table Interface and Virtual Index Interface), etc. However, these mechanisms in general do not coordinate external transaction with the IDS transaction (except homogeneous IDS instances). That is, the IDS Transaction Manager handles two-phase commit only with other IDS database servers. Simple single-phase transaction is supported for official gateways such as DB2 DRDA Gateway, Oracle Gateway, Microsoft® ODBC gateway.

Another problem with the current state of affairs is that any time a new datasource is added, it has to be provided by a particular vendor (IBM, Oracle, etc). With this invention, the transaction manager becomes open and $3^{rd}$ party developers can develop support for any new datasources as they become available.

To solve this particular problem, according to an aspect of the invention, the IDS Transaction Manager is appreciably modified to recognize data sources conforming to the X/Open XA standards and to manage transactions in which these XA data sources participate. More specifically, the new IDS Transaction Manager would invoke support functions/routines for each data source that participated in the distributed transaction at appropriate transactional events such as prepare, commit, rollback, and so on. This interaction would conform to the X/Open XA specification.

As one skilled in the art would appreciate, the present invention is a generalized solution in integrating heterogeneous distributed transaction management into native database systems. It is not limited to the IDS database system and can be implemented in any suitable database engines. On the other hand, the transactional mechanism of the present invention does not itself provide or implement data access mechanisms such as UDRs, table functions, VTI/VII to access external data; it provides the mechanism and tools that allow those who write such access mechanisms, e.g., datablade authors, vendors, application developers, and the likes, to ensure transactional integrity.

Still further objects and advantages of the present invention will become apparent to one of ordinary skill in the art upon reading and understanding the detailed description of the preferred embodiments and the drawings illustrating the preferred embodiments disclosed herein.

DETAILED DESCRIPTION OF THE PREFERRED EMBODIMENTS

Terminology

Figure 1:
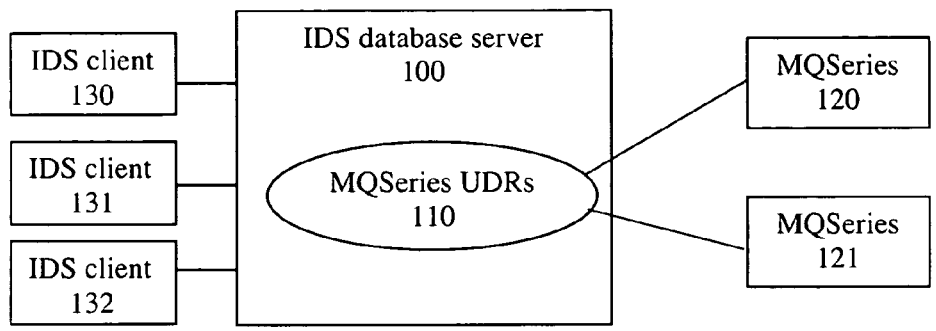
FIG. 1 illustrates an IDS database system implementing the present invention.

MQSeries MQSeries is IBM's middleware for reliable messaging between heterogeneous applications.

MQSeries AMI MQSeries Application Message Interface is set of API routines that can be invoked from application programs to interact with MQSeries.

IBM-Informix MQSeries

Datablade Set of UDFs currently being developed to provide access to MQSeries for IDS applications.

X/Open XA interface X/Open standard interface for interaction between transaction manager and resource manager.

Two-phase commit A protocol that ensures that transactions are uniformly committed or rolled back across multiple database servers. It governs the order in which commit transactions are performed and provides a recovery mechanism in case a transaction does not execute. See also heterogeneous commit.

Heterogeneous commit A protocol governing a group of database servers, of which at least one is a gateway participant. It ensures the all-or-nothing basis of distributed transactions in a heterogeneous environment. See also two-phase commit.

Coordinating server In a query that spans multiple database servers, the server in which the query is initiated is called the coordinator or coordinating server. This server is also called the local server because it is the local server to the client initiating the query. To respond to the query, the coordinating server starts sessions on the other servers involved in the query. See also, distributed query.

Distributed query A query that accesses data from a database other than the current database.

DataSource Type A new type of datasource registered with IDS capable of participating in transaction.

Datasource An instance of a DataSource Type defined above.

Resource Manager ID (RMID) An external XA datasource is referred by XA specification as Resource Manager. When this datasource is created on IDS (using 'create xadatasource' statement, not 'create xadatasource type' statement) a unique identifier is assigned known as RMID. This can be seen by selecting the informix.sysxadatasources or by invoking the function mi_xa_get_xadatasouce_rmid() in a UDR.

UDF/UDR User Defined Function/Routine. Code written in C, Java or SQL that is treated as a function and is callable from SQL.

Overview

The present invention provides a generalized solution to manage transactions at external datasources via an IDS transaction manager. The external datasources need to provide a way to access the external data from SQL. This can be done by providing set of UDRs to retrieve the data (like MQSeries access function sin DB2), table functions (also called 'iterator function in the FROM clause' of select statement) or by providing a VTI (Virtual Table Interface). Readers are directed to the IBM Informix manuals for details on functionality of UDR, iterators function and VTI/VII.

These interfaces (UDR, Table functions, VTI/VII) do not have a mechanism to co-ordinate the external transaction with the IDS transaction. The IDS Distributed Transaction Manager handles 2-phase commit only with other IDS database server or IDS supported Gateways (DB2 DRDA Gateway, Oracle Gateway, Microsoft Transaction Server). Currently, it can use only proprietary SQLI protocol to interact with slave servers and gateways.

The present invention expands the capability of the IDS transaction manager to create new datasource types. The IDS so implemented would recognize new datasources, which can participate in IDS-managed 2-phase commit transactions. The transaction manager would invoke support routines for each datasource that participated in the distributed transaction at appropriate transactional events (prepare, commit, rollback etc). This interaction would conform to the X/OPEN XA specification. The present invention does not itself provide or implement data access mechanisms (UDRs, Table functions, VTI/VII) to access external data; rather, it provides the tools that allow those, e.g., integrators, vendors or application developers, who write such access mechanisms to ensure that they have transactional integrity.

Problem Description

Consider an application interacting with an IDS for accessing the data and MQSeries for managing the message queues.

Begin work;
insert into MESSAGES VALUES(MQRECEIVE());
rollback work;

where MQRECEIVE() is an UDR which pops out a message from MQSeries Message Queue.

When the rollback statement is executed, the insert of rows into the MESSAGES table is rolled back. However, because the IDS is unaware of the operations performed by the MQRECEIVE UDR and MQSeries does not get any notification regarding the rollback, the messages themselves are not put back on to the queue. That is, operations performed on MQSeries queues through the MQ UDRs are not transactionally protected. Consequently, the integrity of the data is compromised.

Currently, the IDS does not have a way to provide transactional context to non-IDS data sources. This invention proposes a standard interface to create and register external datasources that support transactions into IDS transactions via an open standard. By conforming to a widely used standard like such as the X/Open XA standard, the Informix dynamic servers would be in a position to adapt/integrate new datasources when necessary.

Target Applications

According to an aspect of the invention, an IDS having an XA Transaction Manager implementing the present invention enables an easy integration of new datasources into the IDS. In an embodiment, the present invention is utilized by the IBM Informix MQSeries datablade. The MQSeries is used for reliable message exchange between heterogeneous applications.

Currently, many gateways do not support 2-phase commit with remote database servers (for example: DRDA gateway to DB2). Implementing the present invention, these gateways would be able to do so. The present invention can be implemented to integrate any external datasource which provides an XA-conformant transactional interface into the IDS 2-phase commit protocol.

User Alternatives

Users such as application developers can write applications, can use native interfaces such as MQSeries AMI (Application Message Interface) to directly talk to DataSources such as MQSeries. Users will have to manage obtaining data from the MQSeries and the IDS and handle the transactional details. Although this adds additional overhead, application developers will, in effect, be writing an XA transaction manager, albeit one that is proprietary to their application.

MQSeries itself can be used as a transaction coordinator and use database as one of the participants using the XA interface that the IDS has already implemented.

Users can use a third-party transaction monitor (like BEA Tuxedo or Microsoft Transaction Monitor) to manage the transaction in the IDS and MQSeries. The data exchange between the IDS and MQSeries will have to be directed by the application.

Design Strategy

Design Overview

Figure 2:
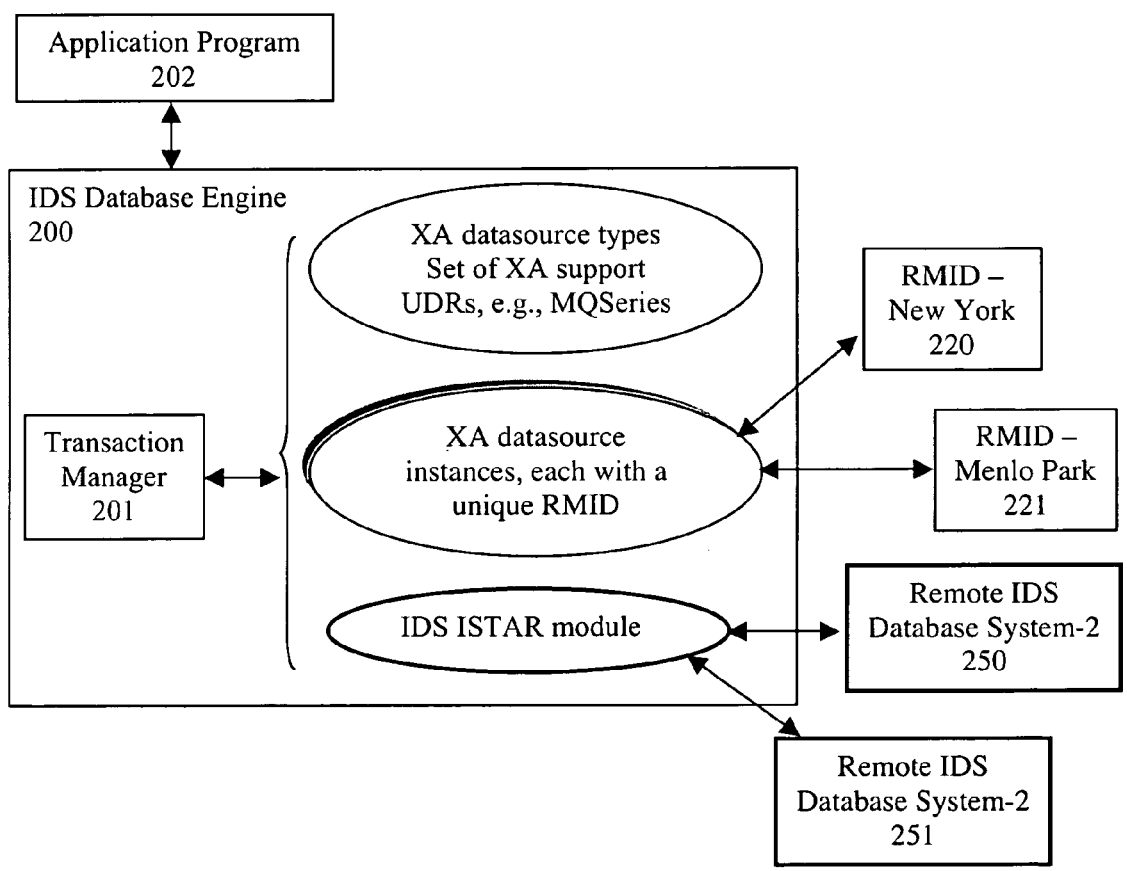
FIG. 2 shows an exemplary database engine embodying the present invention residing in the database server of FIG. 1.

FIG. 1 shows a database system configuration implementing the present invention. In this example, an IDS database server 100 comprising MQSeries UDRs 110 communicates with clients 130, 131, 132, and external datasources 120 and 121. A more detailed implementation is shown in FIG. 2. An application program 202 is in communication with an IDS database engine 200. The IDS database engine 200 comprises a transaction manager 201, which manages various datasource types, datasource instances, and ISTAR module, which communicates with remote IDS database system-2 250 and 251.

As FIG. 2 illustrates, there are two main aspects to this invention. First, recognition of the New DataSource Types. This would include providing unique names to the datasources (e.g., remote MQSeries 220, remote MQSeries 221) and registration of handler functions for each XA transaction events to be handled. Second, recognition of multiple instances of datasource types. There could be multiple instances of these datasource types. The present invention also provide mechanisms to recognize the participation of certain datasources in a transaction and to invoke event handlers for respective datasources with appropriate data (parameters) by the database Transaction Manager 201.

Accordingly, the basic design strategy is to expand the IDS transaction manager to recognize new datasources and notify those datasources by calling appropriate XA event handlers registered.

Transaction Managers in database systems would be highly integrated with the database engine and are extremely critical to ensure the performance of the system and integrity of the data. So, recognizing the datasources participated in a transaction and calling only the relevant handler functions is important. These handler functions should be called at appropriate transactional events (like begin, prepare, commit, rollback etc).

Figure 3:
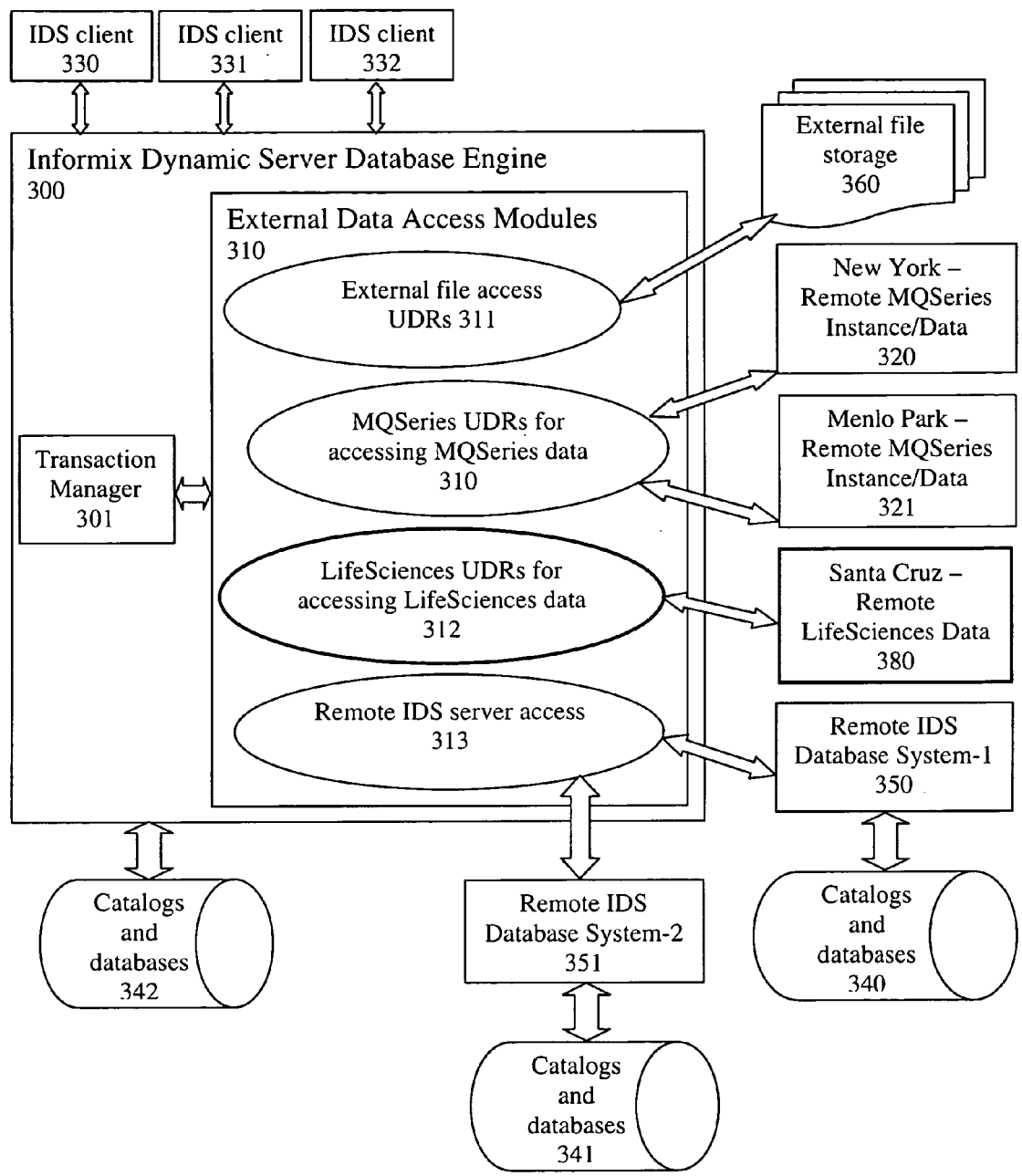
FIG. 3 diagrammatically illustrates the database engine of FIG. 2 system according to an embodiment of the present invention.

Using UDRs, table functions and VTI/VII, the present invention provides access to heterogeneous types of data (unstructured & structured, relational and non-relational). FIG. 3 shows another design implementation of the present invention. An IDS database server comprising an IDS database engine 300 communicates with clients 330, 331, 332, and external datasources 360, 320, 321, 380, 350, and 351. Each client may have one or more application program in communication with the IDS database engine 300. The IDS database engine 300 comprises a transaction manager 301, which manages external data access modules 310. In this embodiment, module 311 contains external file access UDRs, module 310 includes MQSeries UDRs for accessing MQSeries data, module 312 comprises LifeSciences UDRs for accessing LifeSciences data, and module 313 enables remote IDS server access.

In FIG. 3, there are three different types of datasources—MQSeries 320, 321, LifeSciences 380, and remote IDS servers 350, 351. Each of the datasource types can have multiple instances with which a database application needs to interact. In this example, NewYork and MenloPark are instances of MQSeries type of datasource, SantaCruz is an instance of the LifeSciences type of datasource, remote IDS-1 and remote IDS-2 are instances of external IDS servers. Each of the IDS servers shown in FIG. 3 has access to storage means 340, 341, and 342 containing system catalogs and databases.

There are different ways to provide access to external data, including User Defined Routines (UDRs), Virtual Table Interface (VTI), and so on. These access methods can make use of the present invention to provide 2-phase commit transaction support. Here are some exemplary design aspects.

1. IDS can provide a new data type, XID, to represent global transaction ID's.
2. IDS can provide new statements so that XA-compliant data source types and data source instances can be registered with a database (not a server instance).
3. IDS can provide new statements to drop the datasource types and datasource instances from the server.
4. IDS will provide two new interfaces, ax_reg() and ax_unreg(), which will allow DataBlades, UDRs and VTI/VII interfaces to participation of external datasources in a transaction.
5. The authors of DataBlades, UDRs and VTI/VII interfaces can choose to provide and register XA routines (such as xa_open, xa_end, xa_commit, xa_prepare, etc) to handle Transactional Events. The names of these routines are registered with the server using the create xadatasource type statement.
6. Database administrators can create new XADatasource Types and new XA data sources in the IDS representing the DataBlades, UDRs or VTI/VII modules that have been modified to exploit the new transactional semantics.
7. When used inside a transaction, the DataBlade, UDR or VTI/VII module can register its presence in the IDS transaction using an instance of an XA data source.
8. The IDS transaction manager will invoke the registered UDRs when appropriate transactional events occur.

As one skilled in the art would appreciate, although the above-described interfaces are IDS-specific, other implementations are possible within the scope and spirit of the present invention.

Component Interaction Strategy

SQL: Creation of XAdatasource type and XAdatasource.

Processes the 'create xadatasource type' and 'create xadatasource' statements and creates inserts the datasource information in tables informix.sysxasourcetypes and informix.sysxadatasources.

The 'create xadatasource type' provides the XA support UDRs. The SQL layer obtains the internal UDRid for each of these support routines and stores the UDRids in the table informix.sysxasourcetypes. If a UDR with the right signature is not found for each support routine, then an error will be raised.

These XAdatasources are database specific and have to be created in each database that needs access to external data. These XAdatasources can be accessed only when the application is connected to the database in which the datasources are created.

When closing a database (CLOSE DATABASE) or while closing a session, free the XA support structures (functional descriptors for XA support UDRs).

UDR (User Defined Routines):

Provides infrastructure to create UDRs for each of the XA routines specified in the xa_switch_t (specified by XA in xa.h) structure. Will also execute the UDRs in the appropriate language they are created with. This infrastructure currently exists. The datablades/vendors/customers will write these UDRs and create them in an IDS database. No changes are required in UDR component.

These UDRs (like xa_commit, xa_prepare, xa_rollback) will have the datasource specific knowledge and will take appropriate action (commit, prepare, rollback) for the global transaction ID (passed in as parameter to UDRs) on the particular datasource.

The support routines need to be created in every database the application would like to create XAdatasource types and their instances.

Server Application Programming Interface (SAPI):

The SAPI code will provide the following new functions, which should be invoked by any UDR manipulating data on the datasource. In case of MQSeries these routines are MQRecive, MQSend, MQPublish, MQSubscribe. MQRead and MQReadAll do a non-destructive read of the messages on the queue.

The new interfaces are:
mi_xa_register_xadatasource ()
mi_xa_unregister_xadatasource ()
mi_xa get_xadatasource_rmid()
mi_xa_get_current_xid()
ax_reg()
ax_unreg()

Distributed Transaction Manager (RSAM and ISTAR):

The IDS Transaction Manager already generates transaction ID for each transaction in the IDS. According to an aspect of the present invention, the new Distributed Transaction Manager generates and maintains a global transaction ID (of type XID) for each distributed XA transaction in the system. The new Transaction Manager uses the current IDS transaction ID for the global transaction. When using it in the XA context (for example, passing global transaction identifier to support UDRs), it fills the XID structure with this transaction ID.

The new Transaction Manager also maintains a list of XA datasources that participated in each transaction. The datasources that participate in each transaction can register themselves with the Transaction Manager by calling mi_register_xadatasource() at least once per transaction. If, for some reason, the datasource does not want to participate in the 2-phase commit protocol, it can unregister itself by calling mi_unregister_xadatasource().

This component is responsible for obtaining the functional descriptors for each XA support function, executing those UDRs for each datasource in the transaction and handling the errors and exceptions from these UDRs. The Transaction Manager also handles expected return values, errors and invalid return values from these UDRs. The ultimate fate of the transaction (commit, rollback, heuristically committed) is therefore determined by the success or failure of each datasource (both XA datasources and remote IDS participating in the transaction) to prepare/commit.

System High Level Design/Architectural Approach

The present invention enables an IDS transaction manager to be aware of new types of datasources and provides a way for these datasources to register with the IDS. For each datasource type, the present invention provides a set of UDRs that the database transaction manager would invoke during transactional events (commit, rollback, redo, undo, etc).

Creation of XADatasource Types:

Input: SQL statement issued from either application program or datablade registration script.
   e.g. create xadatasource type informix.MQSeries(
      xa_flags=0,
      xa_version=0,
      xa_open=informix.mqseries_open,
      xa_close=informix.mqseries_close,
      xa_start=informix.mqseries_start,
      xa_end=informix.mqseries_end,
      xa_rollback=informix.mqseries_rollback,
      xa_prepare=informix.mqseries_prepare,
      xa_commit=informix.mqseries_commit,
      xa_recover=informix.mqseries_recover,
      xa_forget=informix.mqseries_forget,
      xa_complete=informix.mqseries_complete);

The support UDRs specified here will already have been created in the current database.

These UDRs, XAdatasource types and XAdatasources can be created by any user. The user name informix is used as an example here. The ANSI database and non-ANSI database namespace rules apply for XAdatasource type, XAdatasource names and UDR names.

Processing: Parser: Parse the statement for syntax and semantic validity
   SQL-DML: Create appropriate entries in informix.sysxasourcetypes
   Output: One row per XADatasource Type in informix.sysxasourcetypes Creation of XADatasource instances:

Input: SQL statement from application program or datablade registration script (SQL script).
   e.g. create xadatasource informix.NewYork using informix.MQSeries
Processing: Parser: Parse the statement for syntax and semantic validity
   SQL-DML: Create appropriate entries in informix.sysxadatasources
   Output: One row per XADatasource in informix.sysxadatasources Registration of XADatasource in Transaction:

Input: Call from UDR or a table function to register the datasource using mi_register_xadatasource() (Equivalent of ax_reg())
Processing: SAPI: Add the xadatasource to the list of participating datasources in the current transaction if the datasource is not already on the list, so multiple calls to add the same datasource into a single transaction has no harmful side effect.
Output: Addition of the datasource specified into the list to be processed by the transaction manager.

Transaction Manger:
Input: XA Datasources in a transaction
Processing: Get the functional descriptors for XA support UDRs and call them with the appropriate XID, RMID and flags for the participating XA datasources.
Output: 2-phase commit transaction model for external datasources.

Creation of New XADatasource Type and XADatasource:

A new SQL statement is introduced to create new XA datasource type. The syntax is presented below:

CREATE XADATASOURCE TYPE objectname (purpose-options);
   Purpose-options:
      flags=integer-value;
      version=integer-value;
      xa_open=UDR-name;
      xa_close=UDR-name;
      xa_start=UDR-name;
      xa_end=UDR-name;
      xa_rollback=UDR-name;
      xa_prepare=UDR-name;
      xa_commit=UDR-name;
      xa_recover=UDR-name;
      xa_forget=UDR-name; and
      xa_complete=UDR-name.
"flags" is an OR'd integer value from the following (defined in XA.h specification):
   TMNOFLAGS—No other flags set. Should not be set for IDS XAdatasources.
   TMREGISTER—The XAdatasource dynamically registers with IDS transaction.
   TMUSEASYNC—Indicates that transaction manager can call the xa_functions with the TMASYNC flag and use xa_complete() to get the completion status.

DROP XADATASOURCE TYPE informix.MQSeries RESTRICT;

Here we create a new XAdatasource type called MQSeries and provide the UDRs that would handle various transactional events. The signature of these UDRs are defined by XA specification. This information is stored in a system catalog. Before dropping an XAdatasource type, all the datasources registered with that type should be dropped. Dropping an xadatasource type will not implicitly drop the support UDRs.

Creation and Deletion of New XADATASOURCE.

Applications can create instances of XA datasources using the following the syntax:
   CREATE XADATASOURCE objectname USING <datasourcetypename>;
   DROP XADATASOURCE objectname RESTRICT.

Note that <objectname> and <datasourcetypename> optionally include the owner name separated from the data source (type) name by a period. Example:
   CREATE XADATASOUCE informix.NewYork USING informix.MQSeries;
   DROP XADATASOURCE informix.NewYork RESTRICT.

The xadatasourcetype must already exist in the system (having been created with a 'create xadatasource type' statement). This information is stored in a system catalog. Each xadatasource created is given a unique identification. The xadatasource should not be in use to drop the xadatasource. That is, if a datasource has been registered with a transaction that has not yet completed, it cannot be dropped from the system catalogs.

Registration of XADatasource into Transaction

When a datasource (e.g., NewYork, MenloPark of MQSeries type, or SantaCruz of Lifesciences type) participates in a transaction, it has to register itself with the IDS. Here are the prototypes and details of each interface to do this. This does the functionality of ax_reg() in XA specification. To conform to the XA specification, we are also providing two new interfaces ax_reg() and ax_unrego explained below.

```
Function: mi_xa_register_xadatasource( )
Prototype:
MI_DECL mi_integer MI_PROC_EXPORT mi_xa_register_xadatasource(mi_string xasrc)
/* IN: XAdatasource name */
Registering the datasources with the current IDS transaction must be repeated with each new
transaction. Multiple registrations of the same datasource in a single transaction will have no
effect on either the transaction or the datasource, so there is no need to maintain a count of
how many times an XAdatasource has been registered with the transaction.
Arguments:
xasrc:          User defined name for an instance of XAdatasource Type.
Return Values:
     MI_OK                      - Registered. Go ahead.
     MI_ERROR                   - Could not register ??
     MI_NOSUCH_XASOURCE         - No such datasource in the system.
     MI_INVALID_XANAME          - xasrc is too long
     MI_NOTINTX                 - not in a transaction.
Usage:
mi_integer rc = mi_register_xadatasource("NewYork");
     If (rc != MI_OK)
        {
        sprintf(buf, "mi_register_xadatasource ( ) failed. Error = %d.", rc);
        mi_db_error_raise(...);
        }
Function: mi_xa_unregister_xadatasource( )
Prototype:
MI_DECL mi_integer MI_PROC_EXPORT mi_unregister_xadatasource(mi_string *xasrc)
/*IN: XAdatasource name. */
Unregisters a previously registered datasource with the transaction. The datasource will be
unregistered from the transaction even if it has been registered multiple times. Further, none
```

-continued of the transactional events that it would otherwise have been notified will be received.
Arguments:
xasrc:          User defined name for an instance of XAdatasource Type.
Return Values:
    MI_OK                       - Registered. Go ahead.
    MI_ERROR                    - Could not unregister (transaction could be in critical stage.
    MI_NOSUCH_XASRC             - No such datasource registered
    MI_INVALID_XANAME           - xasrc is too long
Usage:
mi_integer rc = mi_unregister_xadatasource("NewYork");
    If (rc != MI_OK)
      {
      sprintf(buf, "mi_register_xadatasource ( ) failed. Error = %d.", rc);
      mi_db_error_raise(...);
      }
Function: mi_xa_get_xadatasource_rmid( )
Prototype:
MI_DECL mi_integer MI_PROC_EXPORT mi_xa_get_xadatasource_rmid(mi_string xasrc)
/* IN: XAdatasource name */
Get the resource manager ID of the XAdatasource previously created in the database.
Arguments:
xasrc:          User defined name for an instance of XAdatasource.
Return Values:
    Positive Integer            - Resource Manager ID of the Datasource (>= 0)
    MI_NOSUCH_XASRC             - No such datasource type registered
    MI_INVALID_XANAME           - xasrc is too long
Usage:
mi_integer rmid = mi_get_xadatasource("NewYork");
    If (rmid < 0)
      {
      sprintf(buf, "mi_register_xadatasource ( ) failed. Error = %d.", rc);
      mi_db_error_raise(...);
      }
Function: mi_xa_get_current_xid( )
Prototype:
MI_DECL XID * MI_PROC_EXPORT mi_xa_get_current_xid(void)
Returns the XID of the current IDS transaction.
Arguments:
None
Return Values:
Valid Pointer   - Pointer to XID structure containing the current XID. This structure is
               valid only till the end of this UDR. The calling UDR need to copy this
               if it needs to keep the data longer.
NULL            - Not in a transaction.
Usage:
XID *myxid = mi_xa_get_current_xid(void);
    If (myxid == (XID *) NULL)
      {
      sprintf(buf, "mi_get_current_xid( ) failed.");
      mi_db_error_raise(...);
      }
Function: ax_reg( )
Prototype:
MI_DECL int MI_PROC_EXPORT ax_reg(int rmid, /* IN: resource manager ID */
                              XID *myxid, /* OUT: my xid */
                              int4 flags) /* IN flags */
Registers the datasources (rmid) to the current transaction. Readers are referred to the
X/Open XA specification for more details.
Arguments:
rmid:           - XAdatasource (resource manager) ID
myxid           - A valid pointer returned if ax_reg( ) returns TM_OK
flags           - Reserved for future use. Must be set to TMNOFLAGS.
Return Values: from $INFORMIXDIR/incl/public/xa.h
TM_OK           - Registered.
Pointer to XID structure containing the current XID is returned in the second parameter. This
structure is valid only till the end of this UDR. The calling UDR need to copy this if it needs
to keep the data longer.
TMER_TMERR      - Error while registering.
TMER_INVAL      - Invalid arguments.
TMER_PROTO      - Optional.
TM_JOIN         - Optional.
TM_RESUME       - Optional.
Usage:
int rc = mi_xa_get_xadatasource_rmid("informix.NewYork");
rc = ax_reg(5, myxid, 0) ;
    If (rc != TM_OK)
      {
      sprintf(buf, "ax_reg( ) failed.");

-continued

```
        mi_db_error_raise(...);
        }
Function: ax_unreg( )
        Unregisters the XAdatasource from the transaction it previously registered.
Prototype:
MI_DECL int MI_PROC_EXPORT ax_unreg(int rmid, /* IN: resource manager ID */
                                int4 flags)  /* IN: flags */
Unregisters the datasources (rmid) to the current transaction.
See the X/Open XA specification for more details.
Arguments:
rmid:          - XAdatasource (resource manager) ID
flags          - Reserved for future use. Must be set to TMNOFLAGS.
Return Values: from $INFORMIXDIR/incl/public/xa.h
TM_OK          - Registered.
Pointer to XID structure containing the current XID is returned in the second parameter. This
structure is valid only till the end of this UDR. The calling UDR need to copy this if it needs
to keep the data longer.
TMER_TMERR     - Error while registering.
TMER_INVAL     - Invalid Arguments.
TMER_PROTO     - Optional.
Usage:
        int rc = mi_xa_get_xadatasource_rmid("informix.NewYork");
        ...
rc = ax_unreg(5, myxid, 0) ;
        If (rc != TM_OK)
        {
        sprintf(buf, "ax_unreg( ) failed.");
        mi_db_error_raise(...);
        }
```

Distributed Transaction Processing (SQL)

Component Overview

The present invention does not change current transactional (both local and distributed) semantics. Currently, the IDS can only recognize external datasources, which talk SQLI protocol. Hence, in an IDS distributed transaction, only other IDS instances and gateways written for the IDS can participate. The present invention enables an IDS to work with new heterogeneous datasources, provided the data sources support the XA protocol.

The external datasources need to provide a way to access the external data from SQL. This can be done by providing set of UDRs to retrieve the data (like MQSeries) or by providing a VTI (Virtual Table Interface) to access external data. As such, when these UDRs or VTI access methods are invoked, the datasource can register itself with the IDS transaction by calling mi_register_xadatasource() (or ax_reg ()). When registered with an IDS transaction, the IDS creates an internal datastructure with the details of the datasource (including all the information in xa.h/xa_switch_t), resource manager ID (RMID), etc.

For each of the external datasource registered with the transaction, an IDS that implements the present invention will know the datasource type and the support routines. Accordingly, the transaction manager will get the functional descriptors for each of the support routines (xa_prepare, xa_commit, xa_rollback, etc) for the type of the datasource and assign it to appropriate entries in an XA_switch_t structure. Since more than one external datasource types can participate in an IDS transaction, this can be a linked list of xa_switch_t structures in database server internal data representation.

These structures are created dynamically when the datasources are registered by calling mi_xadatasource_register (). However, only one xa_switch_t structure is to be had per datasource type. In the example below, at commit time, the server will have entries for MQSeries and Lifesciences. Since the IDS is aware of type of each datasource, the IDS does not have to create separate xa_switch_t structures for each datasource, but it does need one for each datasource type.

Consider the following transaction in the IDS involving MQSeries:
  begin work;
  insert into work_queue(MQReceive("Menlopark"));
  select MQSend("New York", order_entry) from order_t-
    able;
  Insert into prescription_tab values(patient_info("San-
    taCruz");
  commit work;

The three XADatasources here are "MenloPark", "NewYork" and "SantaCruz". During distributed prepare/commit/rollback events, for each of the Xadatasources registered with the transaction, the DTP will call the corresponding UDR. For example, during the execution of 'commit work' statement above:
  Prepare Stage
  For each XAdatasource registered with the current transaction,
    Call xa_switch_t->xa_prepare_entry(xid, rmid, flags)
      xid: XID of current transaction
      rmid: Resource manager ID
      flags: either TMASYNC or TMNOFLAGS
  Perform the regular 2-phase commit prepare phase with other IDS datasources If all of the participating datasources prepare the transaction to commit successfully (this includes external XAdatasources and IDS database servers), we log the information in the Coordinator and move to Commit Stage:

Commit Stage

For each Xadatasource registed with the current transaction,

Call xa_switch_t->xa_commit_entry(xid, rmid, flags)
xid: XID of current transaction
rmid: Resource manager ID
flags: valid combination of TMNOWAIT, TMASYNC, TMONEPHASE, TMNOFLAGS Depending on the success or failure of each branch of transaction, the transaction will be marked as committed, rolled back or heuristically committed.

If any participating datasource fails to prepare, the global transaction will be rolled back. If, after successful preparation, any datasource fails to commit is transaction branch, then the transaction is considered heuristically committed. This should happen very rarely. So, in the prepare stage, the XAdatasources should make sure that there are no resource or other issues to commit the transaction.

Support functions for each type of XAdatasource has to implement their own timeout mechanism if necessary. If a datasource fails to respond, it is usual (in the IDS and XA) to assume the datasource has rolled back the changes (presumed rollback). In this case, the UDR needs to return the failure (by returning appropriate ERROR code as specified in xa.h specification).

Here are some details on each of the purpose functions, their calling sequences and usage. The usage and calling sequences as well as respecitve return values can be obtained by the XA specification, which is readily available from the X/Open Company Ltd., U.K. The following is an exemplary IDS implementation with IDS-specific details.

| Purpose Function: | int xa_open(char xa_info,/* IN */<br>int rmid, /* IN */<br>long flags) /* IN */ |
|---|---|

Description:

xa_open() purpose function is called once per database session for each XAdatasource that participates in an IDS transaction. The xa_open() is called when the data access mechanisms (UDR, table functions and VTI/VII) register the XAdatasource with the IDS transaction (by calling mi_xa_register_xadatasource() (even in a different tranaction, but in the same session) will not result in invocation xa_open() purpose function. The datasource can have its per database session structures initialized in this routine. When a database session is closed (e.g. CLOSE DATABASE), a new database is opened (DATABASE newdb) or end of client session the XA resources are freed. In the new database session, if there is any XA interaction, the IDS will again call xa_open() in such a way that calling it multiple times in the same database session should not have any harmful effects.

| Parameters: | |
|---|---|
| xa_info | info string, e.g., session@database@online_server_name |
| rmid | Unique Resource manager Identifier |
| flags | Valid values are TMASYNC and TMNOFLAGS. |

Purpose Function: int xa_close(char*xa_info, int rmid, int4 flags)

Description:

For each XAdatasource that the IDS has invoked xa_open (), it will call xa_close() when it no longer wishes to use the XAdatasource for the database session. This occurs when the database is closed (CLOSE DATABASE), a new local database is opened (DATABASE newdb;) or the client session is closed.

| Parameters: | |
|---|---|
| xa_info | session@database@online_server_name |
| rmid | Unique Resource manager Identifier |
| flags | Valid values are TMASYNC and TMNOFLAGS |
| Purpose Function: | int xa_start (XID *xid, /* IN */<br>int rmid, /* IN */<br>long flags) /* IN */ |

Description:

In each transaction, when an XAdatasource registers itself with the IDS transaction, the IDS will invoke the xa_start() support function for its type. This is done once per transaction. Subsequent registrations will not result in invocation of xa_start(). This call is to notify XADatasource (resource manager) to participate in an IDS transaction.

| Parameters: | |
|---|---|
| xid | XID of the current transaction |
| rmid | Resource manager ID |
| flags | Valid flags. ORed value from the following.<br>TMJOIN, TMRESUME, TMNOWAIT,<br>TMASYNC, TMNOFLAGS |
| Support Function: | int xa_end(XID *xid, /* IN */<br>int rmid, /* IN */<br>int4 flags) /* IN */ |

Description:

Called for each XAdatasource participating in the transaction before the prepare stage (if we are planning to commit the transaction) or before the rollback (directly).

| Parameters: | |
|---|---|
| xid | XID of the current transaction |
| rmid | Resource manager ID |
| flags | Valid flags. ORed value from the following. |
| TMSUSPEND | may not be needed for database systems. |
| TMMIGRATE | may not be needed for database systems. |
| TMSUCCESS | work successful. Will be preparing now. |
| TMFAIL | will be rolling back the transaction. |
| TMSYNC | will check for the status later. . . |
| Support Function: | int xa_prepare(XID *xid, /* IN */<br>int rmid, /* IN */<br>long flags) /* IN */ |

Description:

Ask XAdatasource to prepare its transactional changes so that it can commit or rollback the changes. A successful returen from xa_prepare() indicates that the XAdatasource will successfully commit or rollback when requested. The XAdatasource may return XA_RDONLY to indicate that this transaction branch was READ-ONLY. The IDS will not involve this XAdatasource in the rest of the transactional events (commit/rollback).

| Parameters: | |
|---|---|
| xid | XID of the current transaction |
| rmid | Resource manager ID |
| flags | Valid flags. ORed value from the following. |
| TMASYNC | |
| TMNOFLAGS | |
| Support Function: | int xa_rollback(XID *xid, /* IN */ |
| | int rmid, /* IN */ |
| | long flags) /* IN */ |

Description:

Ask XAdatasource to rollback its transaction branch. Called if the application rolls back the transaction or if the prepare stage of the transaction fails.

| Parameters: | |
|---|---|
| xid | XID of the current transaction |
| rmid | Resource manager ID |
| flags | Valid flags. ORed value from the following. |
| TMASYNC | |
| TMNOFLAGS | |
| Support Function: | int xa_commit (XID *xid, /* IN */ |
| | int rmid, /* IN */ |
| | long flags) /* IN */ |

Description:

Ask XAdatasource to commit its transaction branch. The IDS calls xa_commit() on each participating XAdatasource, if all the datasources return TMSUCCESS on calls to xa_end() and TMSUCCESS on calls to xa_prepare().

| Parameters: | |
|---|---|
| xid | XID of the current transaction |
| rmid | Resource manager ID |
| flags | Valid flags. ORed value from the following. |
| TMASYNC | |
| TMNOWAIT | return if blocking condition exists. This flag is ignored if TMONEPHASE is set. |
| TMONEPHASE | Single phase optimization. |
| TMNOFLAGS | |
| Support Function: | int xa_recover (XID *xid, /* OUT */ |
| | long *count, /* OUT */ |
| | int rmid, /* IN */ |
| | long flags) /*IN?*/ |

Description:

Get the list of XIDs that the XAdatasource(resourec manager) has prepared or heuristically completed.

| Parameters: | |
|---|---|
| xid | List of XIDs |
| count | Number of XIDs in the xid array returned. |
| rmid | Resource manager ID |
| flags | Valid flags. ORed value from the following. |
| TMSTARTRSCAN | start the scan |

-continued

| Parameters: | |
|---|---|
| TMENDRSCAN | end the scan |
| TMNOFLAGS | |
| Support Function: | int xa_forget(XID *xid, /* IN */ |
| | int rmid, /* IN */ |
| | long flags) /* IN */ |

Description:

Allow the XAdatasource to forget about heuristically completed transaction.

| Parameters: | |
|---|---|
| xid | XID of the transaction. |
| rmid | Resource manager ID |
| flags | Valid flags. ORed value from the following |
| TMASYNC | will call xa_complete to get the status. |
| TMNOFLAGS | noflags |
| Support Function: | int xa_complete(int handle, /* IN */ |
| | int *retval, /* OUT */ |
| | int rmid, /* IN */ |
| | int4 flags) /* IN */ |

Description:

Test the completion of an xa_operation saynchronously. If a TMASYNC flag has been passed to an xa_call, the XAdatasource should return a handle back without waiting for the operation to complete. The actual operation should continue asynchronously. The TM will call xa_complete() to get the status of the call. If the actual operation is still pending, xa_complete() should wait for the completion and return the status.

| Parameters: | |
|---|---|
| handle | handle returned by the xa_call (default) |
| retval | return value of the xa_call that returned handle |
| rmid | Resource manager ID |
| flags | Valid flags. ORed value from the following |
| TMMULTIPLE | get status of any xa_call( ). Places the handle for the call in *handle |
| TMNOWAIT | test for the completion without blocking. |
| TMNOFLAGS | noflags |

As one skilled in the art will appreciate, most digital computer systems can be programmed to perform the method of the present invention. To the extent that a particular computer system configuration is capable of performing the method of this invention, it becomes a digital computer system within the scope and spirit of the present invention. That is, once a digital computer system is programmed to perform particular functions pursuant to computer-executable instructions from program software that implements the method of the present invention, it in effect becomes a special purpose computer particular to the method of the present invention. The necessary programming-related techniques are well known to those skilled in the art and thus are not further described herein for the sake of brevity.

Computer programs implementing the method of the present invention can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the inventive method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the method of the present invention.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. Accordingly, the scope of the present invention should be determined by the following claims and their legal equivalents.

What is claimed is:

1. A database engine comprising:
   a transactional mechanism supporting heterogeneous distributed transactions, said transactional mechanism having:
      means for recognizing data sources conforming to an industry standard interface for interaction between a transaction manager and resource manager, said data sources including structured and non-structured external data sources; and
      means for managing transactions in which said data sources participate by:
         generating a global transaction identifier for each distributed transaction;
         accessing support functions for data source types for data sources registered to participate in the transaction identified by the global transaction identifier; and
         maintaining a list of all of the recognized heterogeneous data sources that participated in the global transaction identified by the global transaction ID.

2. The database engine according to claim 1, in which said transactional mechanism further comprises, for each of said data sources:
   means for supporting transactional events conforming to the X/Open XA standards, said transactional events including prepare, commit, rollback, redo, and undo.

3. The database engine according to claim 1, further comprises:
   support functions configured to support each recognized data source.

4. The database engine according to claim 3, further comprises:
   means for invoking said support functions at appropriate transactional events, said transactional events including prepare, commit, rollback, redo, and undo.

5. The database engine according to claim 1, in which said database engine supports at least one database application;
   wherein each of said data sources has one or more instances; and
   wherein said at least one database application interacts with said one or more instances via said database engine.

6. The database engine according to claim 1, wherein each of said data sources is a resource manager assigned with a unique identifier.

7. The database engine according to claim 1, wherein said transactional mechanism further comprises:
   means for producing a 2-phase commit transaction model for said data sources.

8. The database engine of claim 1, wherein accessing the support functions comprises:
   invoking said support functions at appropriate transactional events including begin, prepare, commit, rollback, redo, and undo; and
   producing a 2-phase commit transaction model for said data sources.

9. The database engine of claim 1, wherein the industry standard interface comprises the X/Open XA standard.

10. A database server comprising:
    a database engine comprising:
       a transactional mechanism supporting heterogeneous distributed transactions, said transactional mechanism having:
          means for recognizing data sources conforming to an industry standard interface for interaction between a transaction manager and resource manager said data sources including structured and non-structured external data sources;
          means for managing transactions in which said data sources participate:
             generating a global transaction identifier for each distributed transaction;
             accessing support functions for data source types for data sources registered to participate in the transaction identified by the global transaction identifier; and
             maintaining a list of all of the recognized heterogeneous data sources that participated in the global transaction identified by the global transaction ID.

11. The database server according to claim 10, further comprising:
    at least one database application;
    wherein said database engine supports said at least one database application;
    wherein each of said data sources has one or more instances; and
    wherein said at least one database application interacts with said one or more instances via said database engine.

12. The database server according to claim 11, wherein each of said data sources is a resource manager assigned with a unique identifier.

13. The database server according to claim 10, further comprising:
    means for producing a 2-phase commit transaction model for said data sources.

14. The database server of claim 10, wherein accessing support functions comprises:
    invoking said support functions at appropriate transactional events including begin, prepare, commit, rollback, redo, and undo; and
    producing a 2-phase commit transaction model for said data sources.

15. The database server of claim 10, wherein the industry standard interface comprises the X/Open XA standard.

16. A method of integrating a database system to support heterogeneous distributed transactions, comprising:

recognizing data sources conforming to an industry standard interface for interaction between a transaction manager and resource manager, said data sources including structured and non-structured data sources external to said database system; and configuring a database engine with a transactional mechanism, said transactional mechanism managing said heterogeneous distributed transactions in which said data sources participate, wherein said transactional mechanism is capable of managing transactions in which said data sources participate by:

generating a global transaction identifier for each distributed transaction;

accessing support functions for data source types for data sources registered to participate in the transaction identified by the global transaction identifier; and maintaining a list of all of the recognized heterogeneous data sources that participated in the global transaction identified by the global transaction ID.

17. The method according to claim 16, farther comprising:

constructing support functions for each of said data sources that participates in said heterogeneous distributed transactions.

18. The method according to claim 16, wherein said transactional events conform to the X/Open XA standards; and wherein said transactional events include begin, prepare, commit, rollback, redo, and undo.

19. The method of claim 16, wherein the industry standard interface comprises the X/Open XA standard.

* * * * *